United States Patent [19]

Shippert

[11] Patent Number: 5,676,839
[45] Date of Patent: Oct. 14, 1997

[54] FLOATABLE OIL AND DEBRIS COLLECTION DEVICE

[76] Inventor: Ronald D. Shippert, 4975 S. Albion St., Littleton, Colo. 80121

[21] Appl. No.: 701,086

[22] Filed: Aug. 21, 1996

[51] Int. Cl.⁶ ..................................................... C02F 1/28
[52] U.S. Cl. ........................ 210/693; 210/747; 210/91; 210/169; 210/242.1; 210/242.4; 210/924
[58] Field of Search .................... 210/242.1, 242.4, 210/693, 924, 690–692, 694, 169, 747, 91

[56] References Cited

U.S. PATENT DOCUMENTS

| | | | |
|---|---|---|---|
| 3,607,741 | 9/1971 | Sohnius | 210/691 |
| 3,617,566 | 11/1971 | Oshima | 210/40 |
| 3,668,118 | 6/1972 | Rhodes | 210/30 |
| 3,739,913 | 6/1973 | Bogosian | 210/242 |
| 4,172,039 | 10/1979 | Akiyama | 210/502 |
| 4,264,450 | 4/1981 | Ayers et al. | 210/671 |
| 4,332,854 | 6/1982 | Parker | 210/924 |
| 4,340,486 | 7/1982 | Swanson | 210/924 |
| 4,356,089 | 10/1982 | Challener et al. | 210/924 |
| 4,366,067 | 12/1982 | Golding et al. | 210/671 |
| 4,377,478 | 3/1983 | Rolls et al. | 210/924 |
| 4,416,782 | 11/1983 | Kerres | 210/634 |
| 4,439,324 | 3/1984 | Crotti | 210/924 |
| 4,832,852 | 5/1989 | Wells et al. | 210/671 |
| 4,894,166 | 1/1990 | Pitts | 210/663 |
| 4,919,820 | 4/1990 | Lafay et al. | 210/924 |
| 5,002,814 | 3/1991 | Knack et al. | 210/242.2 |
| 5,085,767 | 2/1992 | Beers | 210/169 |
| 5,227,072 | 7/1993 | Brinkley | 210/671 |
| 5,304,311 | 4/1994 | Codiglia | 210/693 |
| 5,364,684 | 11/1994 | Cotton | 210/693 |
| 5,403,478 | 4/1995 | Brinkley | 210/924 |
| 5,462,785 | 10/1995 | Holland | 428/76 |
| 5,468,536 | 11/1995 | Whitcomb et al. | 428/98 |

*Primary Examiner*—Cynthia L. Nessler
*Attorney, Agent, or Firm*—Sheridan Ross P.C.

[57] ABSTRACT

A device is provided in swimming pools, hot tubs, spas or the like for absorbing body and suntan oils, as well as capturing hair, dead insects and other debris commonly found in such systems. The device includes a support member that floats and does not absorb liquids. A plurality of absorbing members are held by the support member. The absorbing members do absorb liquids, such as the suntan and body oils from the water surface. The absorbing members are elongated to provide a substantial surface area for absorption. These elongated members are sufficiently rigid, angled and spaced from each other to facilitate absorption and capturing of debris. Preferably, the device includes a weight member for suitably positioning the device on its own in the water. Preferably also, the support member has a marker to indicate when the device should be cleaned or replaced.

17 Claims, 6 Drawing Sheets

FLOATABLE OIL AND DEBRIS COLLECTION DEVICE

FIELD OF THE INVENTION

The present invention relates to oil absorbing devices placed in pools and other water containing units and, in particular, to a device that floats on water while absorbing oil from the water surface and catching debris, such as grass, leaves, twigs, dead insects and hair.

BACKGROUND OF THE INVENTION

Body and suntan oils from swimmers and others tend to accumulate in water-containing systems such as swimming pools, hot tubs, and spas. It is also common for these systems to collect hair, dead insects and other debris, such as items commonly found in the surrounding environment. In order to handle or remove body and suntan oils, it is known to utilize certain absorption devices placed in the pool. These devices have been configured in all sizes and shapes. Such absorption devices are known to be cylindrical, spherical and have been formed in the shape of a "bug or insect". The absorption device shaped like a bug is made of the same material, i.e., open-cell foam for absorbing liquids and includes integral parts in the shape of a head, arms, legs, body and tail. Each of these devices absorbs oil on the water surface, as well as water itself. Consequently, these devices tend to sink while not absorbing as much of the oils as they might otherwise absorb. Additionally, such devices suffer from the potential drawback of absorbing so much liquid that they sink and can enter the system's piping, which can lead to unwanted results, such as clogging. Each of these devices is limited in the amount of surface area for absorbing the oils and none of them is intended to capture debris that is collected by the water-containing system.

It is advantageous, therefore, to provide an oil absorbing device that floats, as well as being able to capture a variety of debris so that the oils and the debris can be removed from the pool, tub, spa or the like without concern about possible clogging of the system's piping by the device.

SUMMARY OF THE INVENTION

In accordance with the present invention, a device is provided that floats on the surface of the water for absorbing oils while capturing debris. The device includes a support member and a plurality of absorbing members extending from the support member. The support member is floatable, e.g., being made of a closed-cell foam that essentially does not absorb liquid. In one embodiment, the support member is an annular member having a hole. The absorbing members are held by the support member in the hole, which is, preferably, oval in shape to provide a better arrangement or spreading of the absorbing members as they extend from both sides of the support member in order to enhance the desired liquid absorption.

In one embodiment, the absorbing members that extend from one side of the support member are joined to the absorbing members that extend from the opposite side of the support member by a common section that is tightly held in the hole of the support member. In such an embodiment, all of the absorbing members that extend from both sides of the support member, together with the common section, are integrally formed from a single piece of absorbent material. Such absorbent material is typically open-cell foam that absorbs liquids, such as oils, that it comes in contact with. Each of the absorbing members is, preferably, elongated and terminates in a free end. Particularly when free of absorbed liquid, the free ends are spaced from each other and the lengths or body portions of the absorbing members are angled (non-parallel) relative to each other. This establishes a spacing between the free ends of the absorbing members to facilitate the capturing of debris that commonly floats on the water surface. The elongated absorbing members provide a substantial amount of surface area which greatly contributes to the greater amounts of oils that can be absorbed before cleaning the device is appropriate or another device is required. The absorbing members also require certain dimensional magnitudes or sizes in order to properly function in absorbing the relatively substantial amount of oils, as well as catching the debris.

In the preferred embodiment, the support member includes an extension member or projection that extends outwardly relative to the annular body. The extension member is useful in suitably locating the device in the water. That is, the device can be thrown into the pool and the extension member is useful in causing the device to move or turn to a desired position. Preferably also, a weight member is held in the extension member to facilitate the attainment of the desirable or "right" position in the water. The weight member and the extension member are located at or below the water surface.

In the preferred embodiment as well, an indicator is provided with the device. Such an indicator can be a straight line mark on the support member, which is readily visible. This indicator provides information regarding replacement or cleaning of the device. The indicator on the support member moves downwardly towards the water level or surface, as the device absorbs liquid, such as oils, on the surface of the water. When the indicator is at or essentially at the water level, upon observation, it is determined that the device should be cleaned or replaced.

In using the collection device, it is dropped, thrown or otherwise placed in the particular water-containing system, such as a swimming pool. The support member enables the device to continuously float, while the extension and/or weight members act to locate the device in the "righted" position. The elongated absorbing members at the water surface absorb oils, while debris is captured using the spread and angled elongated absorbing members. When it is decided that the device should be cleaned or replaced, such as by means of the indicator, the device is removed from the water. The device is cleaned by removal of oils and debris or, alternatively, disposed of.

A number of salient advantages of the present invention are readily discerned from the foregoing summary. A body oil and suntan oil collection device is disclosed that has a substantial amount of surface area to facilitate absorption of these oils. The elongated and spaced free ends of the absorbing members are useful in capturing hair, dead insects and small items commonly found in the surrounding environment. A support member holds the absorbing members that extend from both of its sides while floating so that the absorbing members remain at a suitable level for oil absorption and debris catching. The device is of an appropriate size to prevent clogging of water system pipes or loss of the device through such piping. Preferably, the support member hole is oval, rather than circular, in shape to enhance the spreading of the elongated absorbing members so that more absorbing members have more contact with the water for absorbing oils. In order to automatically "right" itself, the device may include a weight member so that there is no concern about the proper position of the device relative to the water surface. An indicator can be provided on the support member to provide information as to when the device should be removed for cleaning or replacement.

Additional advantages of the present invention will become readily apparent from the following discussion, particularly when taken together with the accompanying drawings.

DETAILED DESCRIPTION

Figure 1:
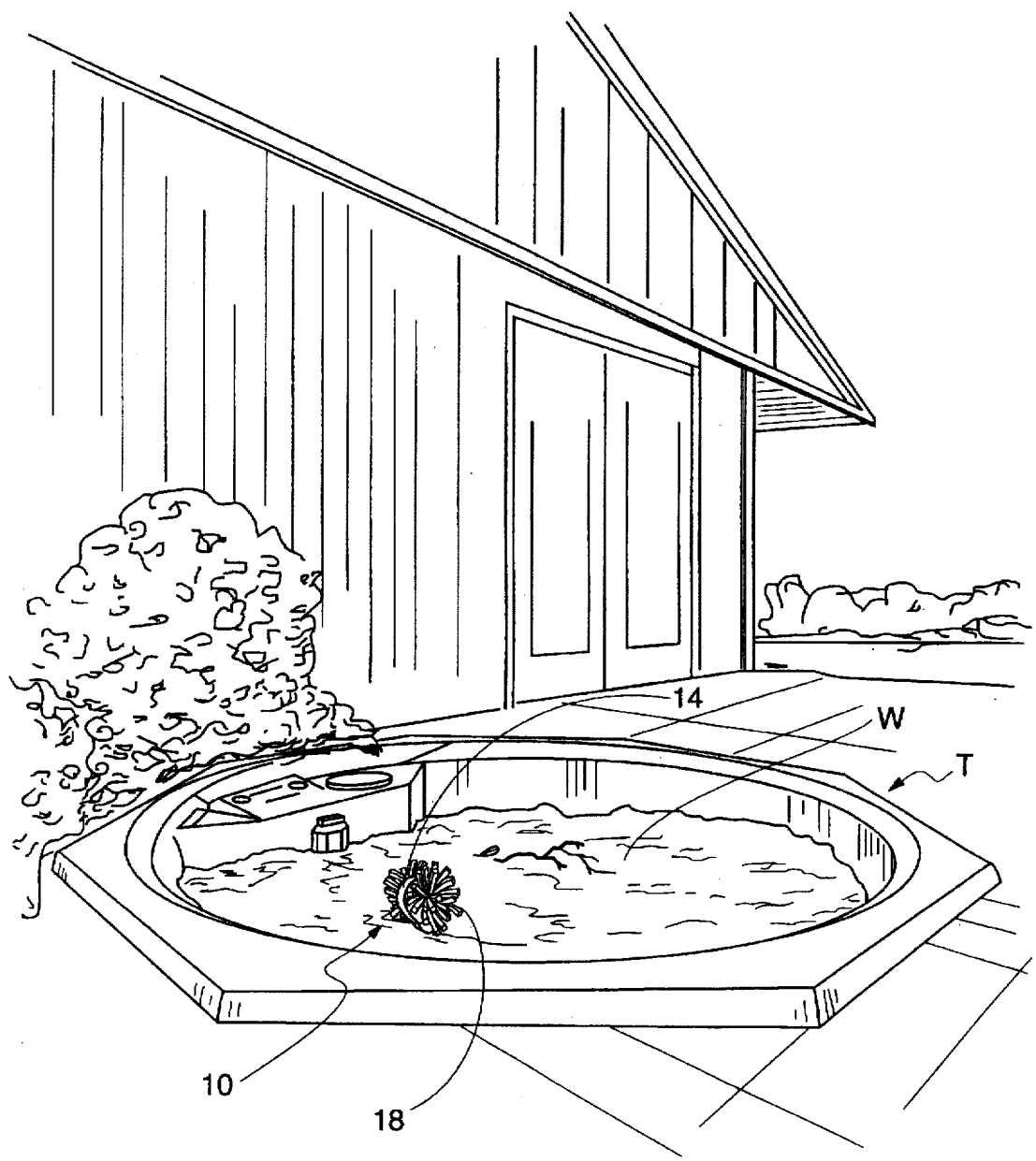
FIG. 1 is a perspective view of the absorbing and collecting device of the present invention located in the environment of a hot tub.

With reference to FIG. 1, an absorbing and collecting device 10 is illustrated as being used in a water-containing system, namely a hot tub T. The hot tub T contains water, and the device 10 floats on the water W and parts thereof are located above the water surface or level. The device 10 is able to absorb liquids, such as suntan or other body oils that may be found on the water's surface. Additionally, the device 10 is able to capture or collect unwanted debris that might be present in the hot tub T.

Figure 2:
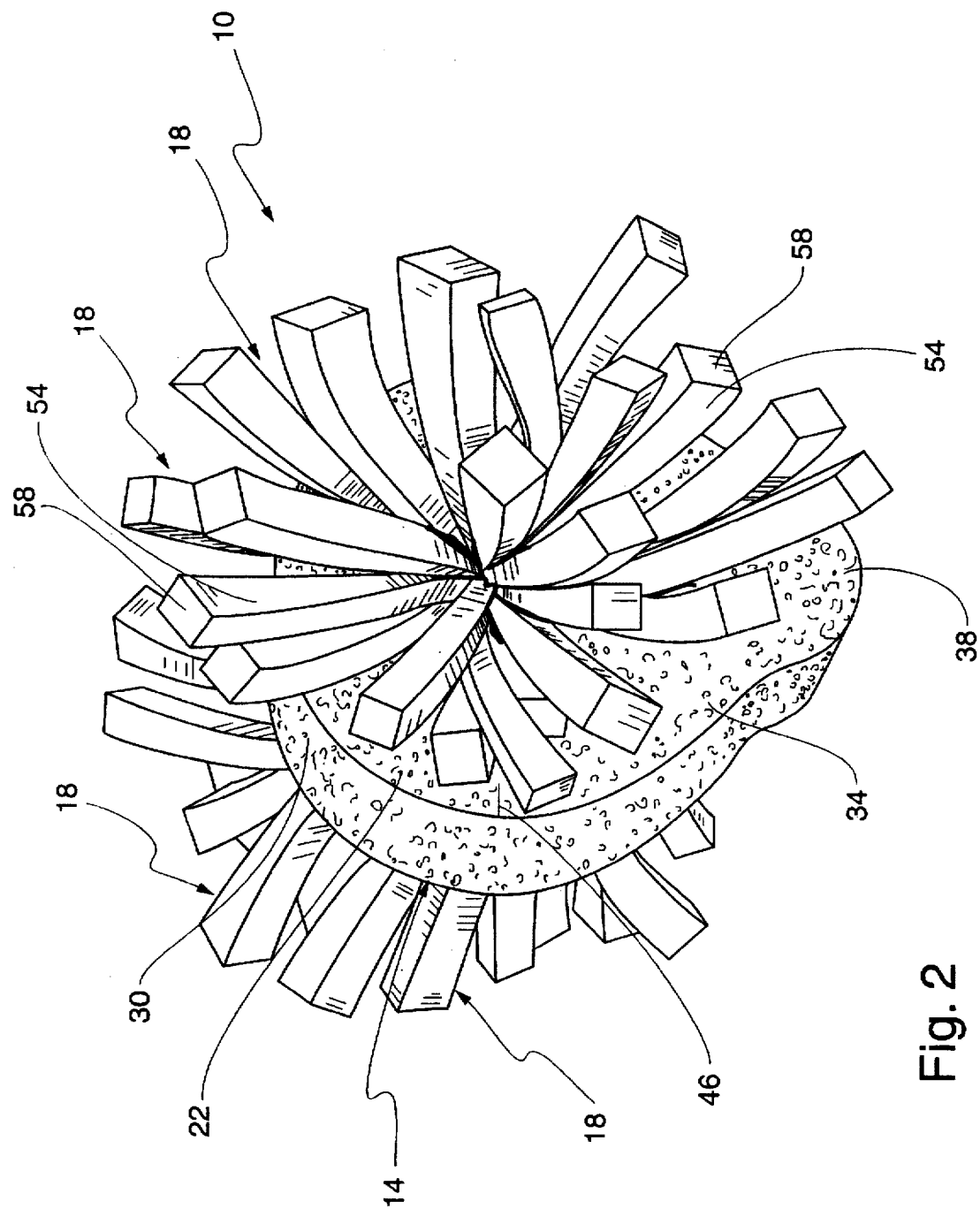
FIG. 2 is a perspective of the device by itself illustrating the elongated and angled absorbing members being held in the support member.
Figure 3:
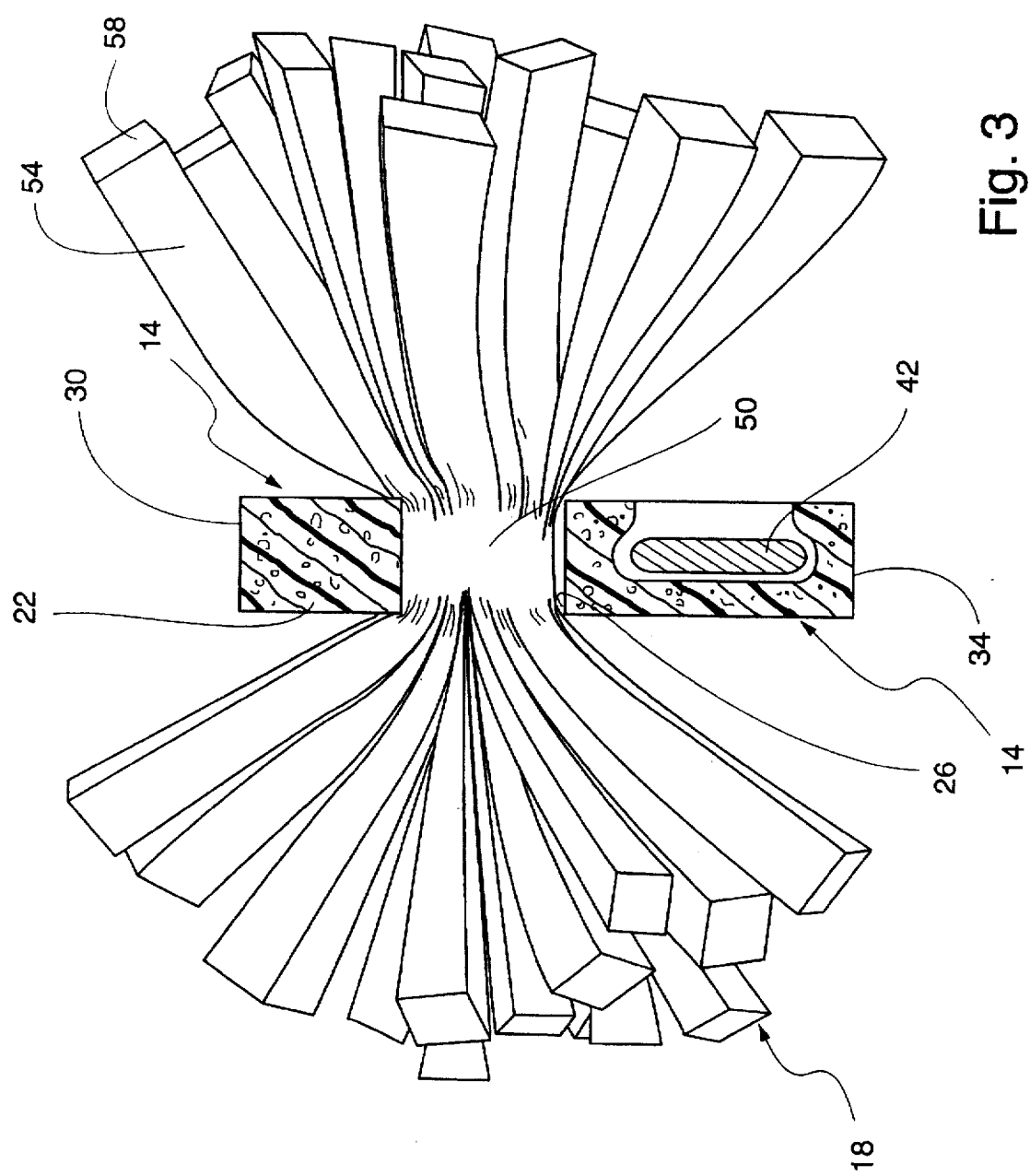
FIG. 3 is a cross-sectional view of the support member that illustrates the weight member and the common section of the absorbing members.

With reference to FIGS. 2 and 3, the parts of the absorbing and collecting device 10 will be described in detail. The device 10 includes a floatable support member 14 and a plurality of absorbing members 18 that are made from a material different from the support member 14. In one embodiment, the support member 14 is made from a closed-cell foam that allows it to float in liquid, for example, double laminated, non-cross linked polyethylene. Conversely, the absorbing members are made from a material that permits them to absorb liquid, such as an open-cell polyethylene.

The support member 14 includes a body 22 that is generally annular in shape. A hole 26, identified in FIG. 3, is formed through the body 22. Preferably, the hole is oval-shaped, rather than circular, to provide a desired arrangement of the absorbing members 18 by which more absorbing surface area is spread relative to the water. The body 22 of the support member 14 has an upper section 30 and a lower section 34. The lower section 34 includes an extension member 38, which extends from the lower section 34 and modifies the essentially circular shape of the body 22. The extension member 38 is useful in desirably locating the floatable support member 14 in a "right" position when it is placed in the water. Preferably also, as seen in FIG. 3, in at least portions of the extension member 38, a weight member 42 is disposed. In one embodiment, at least most of the weight member 42 is located in the extension member 38. As can be appreciated, the weight member 42 contributes to a desired positioning of the device relative to the water. As also seen in FIG. 2, a marker or indicator 46 is formed on a portion of the body 22 of the support member 14. In one embodiment, the marker 46 is a line having a color different from that of the surrounding portions of the support member 14. Generally, the marker 46 is formed closer to the top of the support member body 22 than it is to the bottom of the extension member 38. The marker 46 is useful in indicating when the device 10 should be cleaned or replaced. That is, upon observation that the marker 46 is at a particular position relative to the water level, the device 10 should be removed from the water and be cleaned or, alternatively, the device 10 should be replaced.

With respect to certain dimensional parameters, the width or diameter of the support member 14 should be in the range of 3 to 5 inches and, more preferably, about 3.5 inches. The distance from the bottom of the extension member 38 to the center of the hole 26 should be in the range of 1.5 to 3 inches, and, more preferably, should be about 2.25 inches. The volume of the support member 14 should be in the range of 6 to 10 cubic inches and, more preferably, about 8 cubic inches.

With respect to the weight member 42, it should be in a desired ratio relative to the volume of the support member 14. In particular, the ratio of the weight of the weight member 42 to the volume of the support member 14 should be 0.3–0.7 ounce weight of the weight member 42 to 50–90 cubic inches of the support member 14. More preferably, this ratio should be about 0.5 ounce of the weight member 42 to about 70 cubic inches of the support member 14.

With continued reference to FIGS. 2 and 3, the absorbing members 18 will be described in greater detail. The absorbing members 18 extend from opposite sides of the support member 14. Preferably, but not necessarily, an equal number of absorbing members 18 are found on the opposite sides of the support member 14. The absorbing members, on each of the two sides of the support member 14, extend generally at an angle relative to each other, i.e., they are not parallel with each other to contribute to a spreading of the absorbing members 18 relative to each other whereby spaces or gaps are created between and among the absorbing members 18. Such a configuration is useful in collecting or capturing debris when the device 10 is placed in the water. As seen in FIG. 3, essentially all of the absorbing members 18 diverge at an angle from the hole 26 of the support member 14. Preferably, all of the absorbing members 18 are joined together by a common section 50 disposed in the hole 26. In making or forming the absorbing members 18, they are cut or otherwise created from a single piece of open-cell foam material.

With regard to the individual absorbing members 18, each is elongated in shape and has a body or length 54 that terminates in a free end 58. The elongated body 54 is straight or substantially straight, particularly when dry, and the free end 58 including portions adjacent thereto, when dry, is rigid and is part of the essentially straight configuration of the body 54. When the absorbing member 18 absorbs liquids, such as oils, the straight configuration, particularly at the free end 58, changes so that the absorbing member 58 is more curved in shape.

In order to desirably function, it is necessary that the absorbing members 18 be maintained within certain dimensional constraints. Specifically, the length of the absorbing members 18 should be in the range of 2 to 3 inches, and, more preferably, about 2.5 inches. When the absorbing member 18 has a length greater than the upper end of this range, there is the potential that it will lose desired rigidity and strength and will not have the desired linearity or straightness. An absorbing member 18 that is less than the lower end of this range unwantedly reduces the volume of the absorbing member 18 and thereby reduces the amount or degree of absorption that a particular one absorbing member 18 can achieve. The width of the absorbing member 18 is in the range of 0.25 to 0.75 inch and preferably about 0.5 inch. The number of absorbing members on each side of the support member 14 is in the range of 10 to 40 and, preferably, about 20 absorbing members 18 per side of the support member 14. The total volume of the absorbing members 18 is in the range of 25 to 35 cubic inches and, more preferably, about 30 cubic inches. An appropriate ratio exists between the volume of the support member 14 and the total volume of the absorbing members, namely, the volume ratio of the support member 14 to the absorbing members 18 is in the range of 1:8 to 1:2 and, more preferably, about 4:15.

Figure 4:
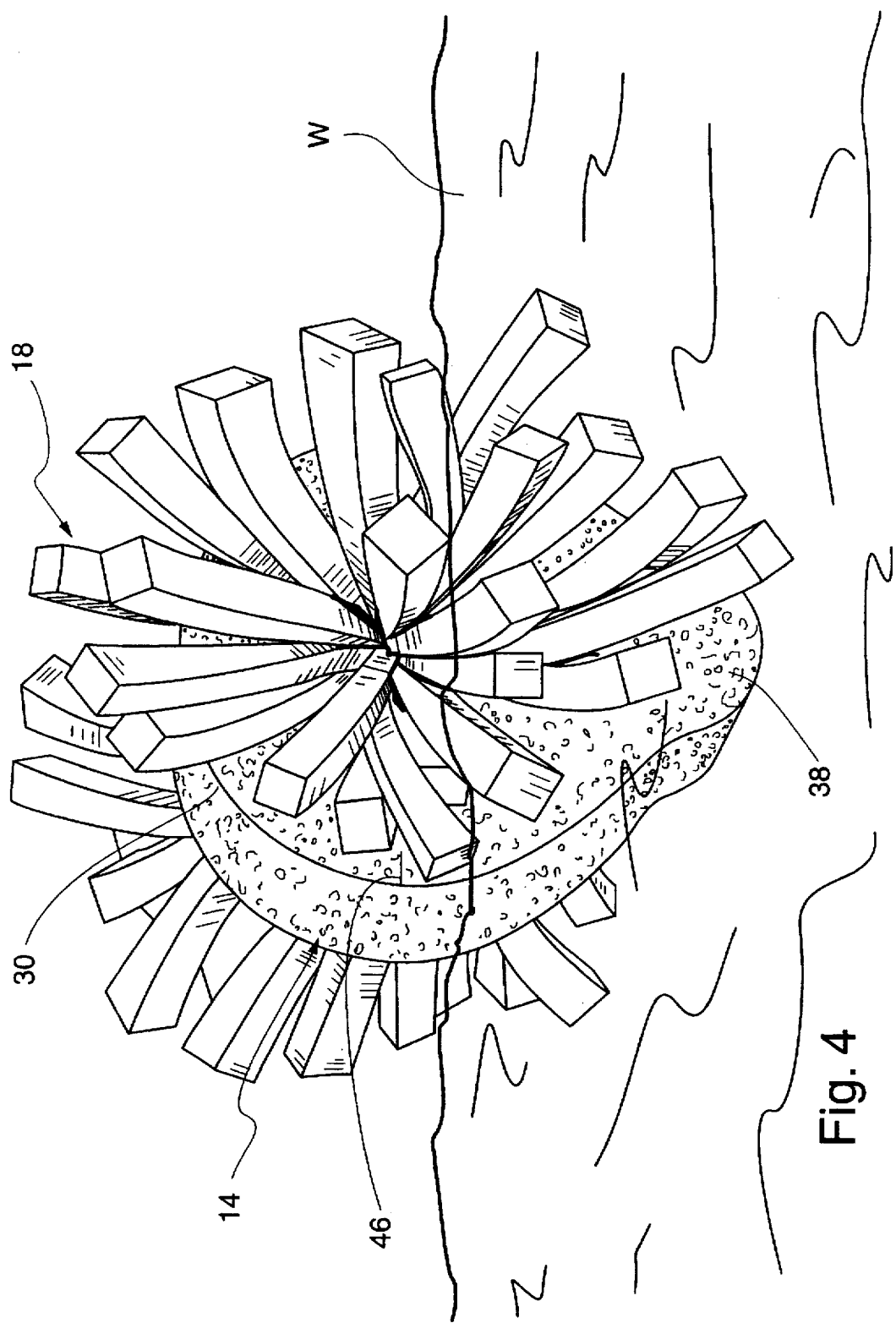
FIG. 4 is a perspective view of the device placed in water.
Figure 5:
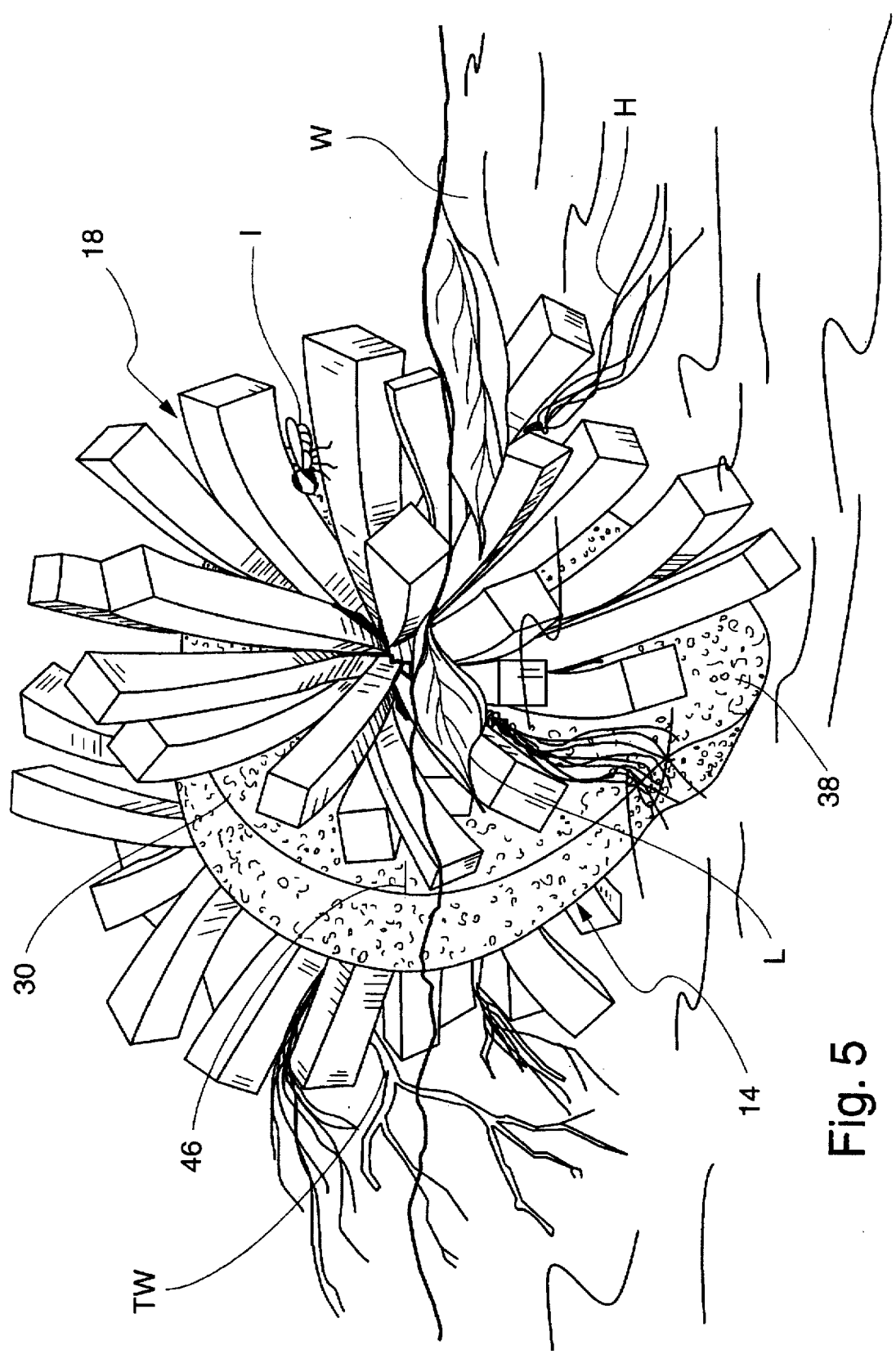
FIG. 5 is a perspective view showing use of the device in capturing debris and its movement downwardly in the water as it absorbs liquids such as oils.
Figure 6:
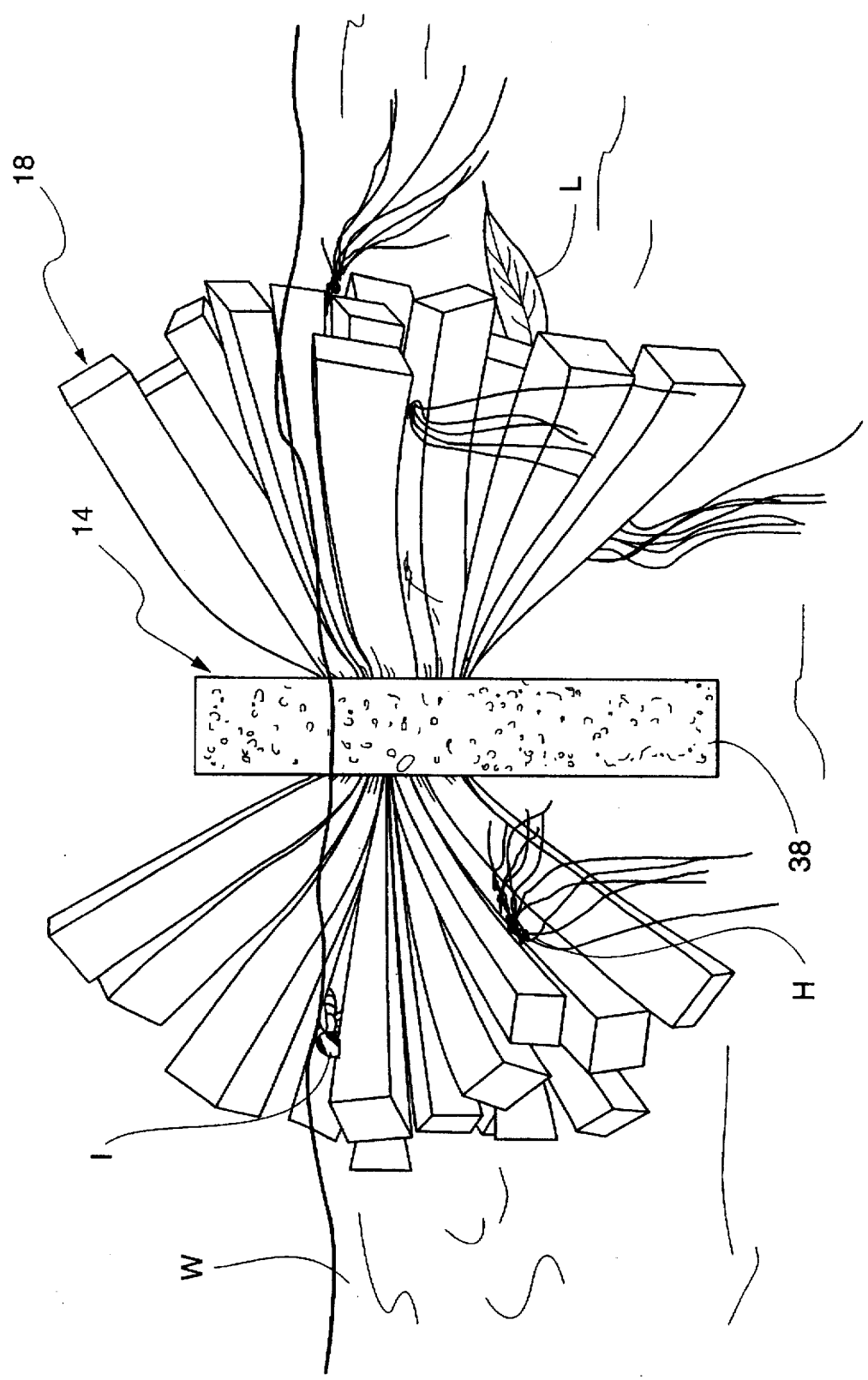
FIG. 6 is a side view of the device illustrated in FIG. 5.

With reference now to FIGS. 4–6, use of the device 10 will be further explained. As seen in FIG. 4, the device 10 has been thrown or otherwise placed in water. The extension member 38 and/or weight member 42 contribute to a "righted" position of the device 10 in which the extension member 38 is located at or beneath the surface of the water. As also seen in FIG. 4, the marker 46 is located at a desired distance from the water surface or level when the device 10 is initially located in the water. Referring to FIG. 5, over time, the device 10 absorbs liquids, such as suntan and/or body oils. The additional weight of such liquids causes the device 10 to sink deeper into the water. This is reflected by a change in the marker 46 relative to the water level. As seen in FIG. 5, the marker 46 is closer to the water's surface than that shown in FIG. 4. Additionally, the absorbing members 18 act to collect debris from the surface of the water including dead insects I, leaves L, hair H, and twigs TW. A side view of the device 10 in which the absorbing members 18 have absorbed liquids and captured debris is provided in FIG. 6. In this state, the device 10 can be removed from the water and cleaned or replaced by another device 10.

The foregoing discussion has been presented for purposes of illustration and description. Further, the description does not intend to limit the invention to the form disclosed herein. Variation and modification commensurate with the above teachings, within the skill and knowledge of the relevant art, are within the scope of the present invention. The embodiments described hereinabove are further intended to explain the best modes presently known of practicing the invention and to enable others skilled in the art to utilize the invention as presented, or in other embodiments, and with the various modifications required by their particular applications or uses of the invention. It is intended that the appended claims be construed to include alternative embodiments to the extent permitted by the prior art.

What is claimed is:

1. A method for absorbing oil and catching debris in a swimming pool, spa, or hot tub, comprising:

extending a plurality of absorbing members forming a bundle having end portions extending through a non-absorbent support member floating in water, said extending step including spacing said end portions from each other a sufficient distance to permit capture of debris and said plurality of absorbing members being of sufficient size so that oils can be absorbed from the water while said end portions are non-parallel relative to each other;

absorbing liquids by at least some of said plurality of absorbing members; and catching debris between said ends of at least some of said absorbing members.

2. A method, as claimed in claim 1, wherein:

said extending step includes locating said plurality of absorbing members and said support member in the water when said absorbing members including said end portions thereof are substantially free of liquid and in which said end portions have sufficient rigidity to extend substantially in a straight line.

3. A method, as claimed in claim 1, further including:

keeping said support member substantially free of absorption of liquid.

4. A method, as claimed in claim 1, further including:

moving a marker downwardly as liquid is absorbed by at least some of said absorbing members.

5. A method, as claimed in claim 1, further including:

observing a marker relative to water level and determining that sufficient liquid has been absorbed by at least some of said absorbing members.

6. A method, as claimed in claim 1, further including:

locating said support member in a desired position in the water using an extension member of said support member and a weight member held by said extension member.

7. A floatable device for absorbing oil and catching debris located in water that is contained in a swimming pool, spa, or hot tub, comprising:

a support member made of one or more materials that do not absorb liquids, said support member defining means for floating said device;

a plurality of absorbing members held by said support member in which at least portions of said absorbing members are of a size and spaced at a sufficient distance from each other to capture debris in the water and each of said absorbing members is made of a material for absorbing liquids including oils;

wherein said support member defines a hole and said plurality of absorbing members form a bundle held in and extending through both sides of said hole.

8. A device, as claimed in claim 7, wherein:

said hole is substantially oval in shape.

9. A device, as claimed in claim 7, wherein:

said absorbing members are connected together by a common section that is located in said hole.

10. A device, as claimed in claim 7, wherein:

said support member includes an extension member that is used in desirably positioning said device in the water.

11. A device, as claimed in claim 7, further including:

a weight member held in a section of said support member that is used to desirably position said device in the water.

12. An device, as claimed in claim 7, further including:

a marker located on said support member to indicate when said support member has moved a predetermined distance downwardly relative to the water and at least some of said absorbing members have absorbed sufficient liquid.

13. A device, as claimed in claim 7, wherein:

said plurality of absorbing members have free ends and said free ends have sufficient rigidity to extend linearly relative to remaining portions of said absorbing members and said remaining portions are non-parallel relative to each other when said device is placed in the water.

14. A device, as claimed in claim 7, wherein:

each of said plurality of absorbing members is elongated and has a width of at least about 0.25 inch for providing sufficient rigidity to capture debris.

15. A device, as claimed in claim 7, wherein:

each of said plurality of absorbing members has a length that extends from said support member at least about two inches.

16. A device, as claimed in claim 1, wherein:

said plurality of absorbing members includes at least ten of said absorbing members and the width of said absorbing members is no greater than about 0.75 inch.

17. A device, as claimed in claim 1, wherein:

said plurality of absorbing members has a first volume and said support member has a second volume and in which said first volume is at least twice that of said second volume.

* * * * *